United States Patent
Solis et al.

(10) Patent No.: US 8,488,465 B2
(45) Date of Patent: Jul. 16, 2013

(54) INTERCEPT FLOW DISTRIBUTION AND INTERCEPT LOAD BALANCER

(75) Inventors: Norman Richard Solis, Fairfax, VA (US); Dante J. Pacella, Charles Town, WV (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

(21) Appl. No.: 12/117,138

(22) Filed: May 8, 2008

(65) Prior Publication Data
US 2009/0279432 A1 Nov. 12, 2009

(51) Int. Cl.
*H04L 12/26* (2006.01)

(52) U.S. Cl.
USPC .......................... 370/235; 370/394; 709/232

(58) Field of Classification Search
None
See application file for complete search history.

(56) References Cited

U.S. PATENT DOCUMENTS

| | | | |
|---|---|---|---|
| 6,757,373 B1* | 6/2004 | Rubinstein et al. | 379/221.01 |
| 7,395,538 B1* | 7/2008 | Carney et al. | 718/105 |
| 7,809,827 B1* | 10/2010 | Apte et al. | 709/224 |
| 2004/0258073 A1* | 12/2004 | Alexander et al. | 370/395.5 |
| 2005/0002334 A1* | 1/2005 | Chao et al. | 370/230 |
| 2005/0276263 A1* | 12/2005 | Suetsugu et al. | 370/389 |
| 2008/0276294 A1* | 11/2008 | Brady | 726/1 |
| 2009/0130984 A1* | 5/2009 | Lee | 455/67.11 |
| 2009/0201811 A1* | 8/2009 | Filsfils et al. | 370/235 |

* cited by examiner

*Primary Examiner* — Yemane Mesfin
*Assistant Examiner* — Khoa Huynh (57) ABSTRACT

A system and method for intercepting and load-balancing information including one or more mediation devices configured to receive intercept instructions for intercepting information for a predetermined period of time, an intercept access device configured to receive the intercept instructions from the one or more mediation devices, wherein the intercept access device may identify and intercept information based on the intercept instructions and may encapsulate the intercepted information, and an intercept load balancer configured to receive the intercepted information and transmit the intercepted information to the one or more mediation devices for distribution to one or more law enforcement device.

22 Claims, 5 Drawing Sheets

INTERCEPT FLOW DISTRIBUTION AND INTERCEPT LOAD BALANCER

BACKGROUND INFORMATION

The Communications Assistance for Law Enforcement Act (CALEA) is a wiretapping law that was passed in 1994, which recites that telecommunications carriers "shall ensure that its equipment, facilities, or services that provide customer or subscriber with the ability to originate, terminate, or direct communications are capable of expeditiously isolating and enabling government . . . intercept, to the exclusion of any other communications, all wire and electronic communications carried by the carrier." In other words, the CALEA provides that telecommunication carriers, such as common telephone carriers, facilities-based broadband Internet access providers, providers of interconnected Voice over Internet Protocol (VoIP) service, and manufacturers of telecommunications equipment, must design their equipment and networks to facilitate lawfully conducted intercepts, while protecting the privacy rights of customers. Although equipment and network upgrades began after the CALEA requirements were issued, some current systems may not fully comply with all requests of a Law Enforcement Agency. For instance, these systems are limited to 100 mbps aggregate with respect to information transfer. This is significantly lower than many of the aggregate flows on a network. In fact, several links in the core of the network are already at 40 gbps. As a result, as tap and warrant criteria continue to broaden, current systems lack a technique to comprehensively and effectively intercept and load balance information to meet the CALEA requirements.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for intercepting and load balancing information. That is, exemplary embodiments may, among other things, expand and optimize intercept flows and load balancing in accordance with the CALEA requirements.

The exemplary systems and methods are discussed in terms of "intercept flows" and "intercept load balancing." It should be appreciated that as used herein, an "intercept" may refer to traffic coming from a tap for specific IP traffic. A "flow," as used herein, may refer to flow of information, such as those communicated over a network. For example, a flow may include an Internet Protocol (IP) flow of information having a unique "5-tuple." It should be appreciated that a "5-tuple," as used herein, may include various information, such as source IP address, destination IP address, protocol, source port, destination port, and/or other identifier. An "intercept ID," as used herein, may refer to a unique value associated with an intercept. An "intercept sequence number," as used herein, may refer to an sequence number (e.g., a 32-bit sequence number) that enumerates information packets in order for an intercept irrespective of the individual IP flows making up the intercept.

It should also be appreciated that as used herein, a "hash value" may refer to a unique value used for identification purposes of a relatively large amount of information (e.g., in a data packet or document). For example, a hash value may be a string of digits that uniquely identify a document. One property of a hash value is that even if the hash value is known, the original data used to compute that value may not be readily used to recreate the document. However, for any given document, the same hash value may be easily recreated via computation. In addition, a "hash collision," as used herein, may refer to a situation where two or more different documents generate the same hash function. Thus, when a hash collision occurs between two or more hash functions, it may be presumed via statistical measures of security that the original documents corresponding to the two or more hash functions are the same document. Accordingly, the generation, addition, and/or use of hash functions may permit identification of the flows (e.g., documents or other information) by looking at individual hashes, rather than at a large 5-tuple, as a way to efficiently and effectively provide load balancing across all flows without requiring an intervening device (such as the load balancer described) to have knowledge of the individual flows represented in the intercept.

As discussed above, current systems cannot fully comply to all information requests of law enforcement agencies. For instance, when traffic is intercepted at rates greater than 100 mbps, packets may be lost indiscriminately across all flows. For example, if 100 packets were transmitted to law enforcement agencies based on a subject of a warrant, even though 100% of the data packets may be sent as requested by law enforcement agencies, data packets may still be lost during transmission due to various limitations, deficiencies, and/or errors in transmission. For example, out of 100 packets, only 98 packets may actually be received by law enforcement. In this example, law enforcement may not even have knowledge that two packets are missing because there is no way for the record of intercepted communication to indicate when a packet was missed or whether a packet was missing from the intercept.

Figure 1:
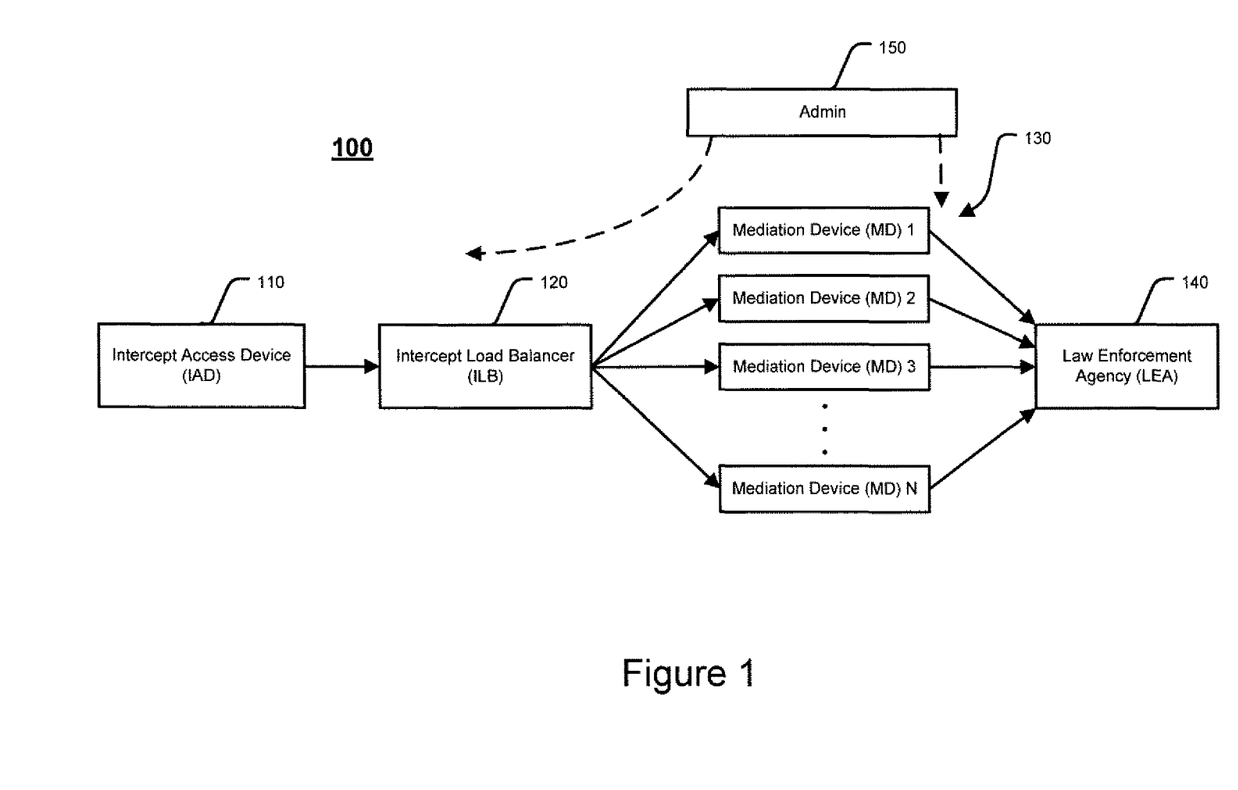
FIG. 1 depicts a block diagram of a system architecture for intercepting and load balancing information, according to an exemplary embodiment.

FIG. 1 depicts a block diagram of a system architecture for intercepting and load balancing information, according to an exemplary embodiment. It should be appreciated that system 100 is a simplified view for intercepting flows and load balancing across all flows and may include additional elements that are not depicted. As illustrated, the system 100 may be part of a network and may include an Intercept Access Device (IAD) 110 operatively coupled to an Intercept Load Balancer (ILB) 120. The ILB 120 may be operatively coupled to one or more Mediation Devices (MDs) 130, which in turn may be operatively coupled to and ultimately pass intercepted information, e.g., an intercepted data packet, to a Law Enforcement Agency (LEA) 140. An administrator 150 may be also be provided at the system 100 to communicate to with the one or more MDs 130, the ILB 120, the IAD 110, and/or other components of the system 100. It should be appreciated that while the IAD 110, the ILB 120, and the MDs 130 may be one or more servers, server-like devices, and/or modules, other various network devices or components may also be used.

In the system 100, one or more flows may be intercepted at the IAD 110, The IAD 110 may receive intercept instructions from one or more MDs 130. Typically, an LEA 140 may request from a service provider information relating to a particular individual (e.g., all websites visited by a particular subscriber of the service provider), a particular host (e.g., all visits to a particular website and by all visitors), or a combination thereof (e.g., all visits to one or more particular websites by a particular individual). An LEA 140 may refer to any entity with the power to request assistance under the CALEA portions of the Communications Act. Such agencies may include local law enforcement at the city, state, and federal level. In practice, this may include almost any government body with the power to compel assistance via the issuance of a warrant. Other various embodiments may also be provided. The administrator 150 may instruct the one or more MDs 130 to acquire copies of such information at the IAD 110. Thus, when the IAD 110 recognizes information communicated to or from a particular subscriber or a particular host, for example, the AD 110 may intercept the flow by copying the flow and sending the information to the Intercept Load Balancer (ILB) 120 for distributing to the one or more MDs 130, which in turn send the information to the LEA 140. It should be appreciated that intercepting information does not affect transmission and/or reception of information to/from the subject of a warrant (e.g., a particular subscriber, particular website, etc.).

In other words, if Mr. X is the subject of a warrant, for example, an LEA 140 may request Mr. X's service provider to provide all information relating to Mr. X's visits to a particular website over a predetermined period of time. Such information may include copies of all of Mr. X's requests and transmissions to and from this particular website. The one or more MDs 130 may be programmed to retrieve such information by an Administrator 150. As a result, each time Mr. X visits this particular website during the predetermined period of time, the IAD 110 may intercept the flow by copying the packet of information and preparing it for delivery to the Intercept Load Balancer 120. It should be appreciated that other information consisting of metadata about the intercept may also be delivered with the packets. Examples of metadata may include timestamp information as well as other identifying data about the endpoints of the communication or the intercept itself.

It should be appreciated that flows or data packets may be intercepted in real-time or near real-time, e.g., at about the same time as the original or actual intercept. It should also be appreciated that intercepted information may be stored in one or more data storage systems (not shown) in the system 100. For example, these one or more data storage systems may be connected to the IAD 110, the ILB 120, the MDs 130, the LEA 140, or a combination thereof.

In addition, it should be appreciated that each intercepted data packet may be encapsulated at the IAD 110 as well. For example, as data packets are intercepted by the IAD 110, an Intercept ID may be attached to each data packet for uniquely identifying the data packets. In addition, a sequencing scheme (e.g., a numbering scheme, alphanumeric sequencing scheme, etc.) may also be provided. For example, an intercept sequence number may also be attached to each intercepted data packet to identify and/or preserve the order of the intercepted data packets. In another embodiment, the numbering scheme may allow the intercepted data packets to be grouped under an Intercept ID for forwarding to the LEA 140.

Although the TAD 110 is described as the component capable of encapsulating the one or more intercepted data packets, it should be appreciated that the Intercept Load Balancer (ILB) 120, itself or in combination with the IAD 110, may also encapsulate the intercepted data packets as well.

Before proceeding to the LEA 140, the ILB 120 may receive the intercepted data packet from the IAD 110 and may add a hash of the intercepted 5-tuple of the intercepted data packet to the intercepted data packet. A hash may be generated by mathematical computation or other computations. As discussed above, a 5-tuple of an intercepted data packet may include various identification information of the packet, such as source IP address, destination IP address, protocol, source port, destination port, and/or other identifier. Although the 5-tuple provides a unique identification of the intercepted data packet, the fact that it may include so many different identifiers makes it relatively difficult to use. For example, using the 5-tuple may be relatively time-consuming and inefficient and may require additional software and/or hardware resources, thereby increasing costs as well. As result, adding a hash function to the intercepted data packet may provide a simpler and more efficient way to identify the intercepted data packets. For example, rather than unpacking and interpreting an entire 5-tuple, a hash function may serve as a tracking/identifying means for each intercepted data packet.

For example, an MD 130 may typically take one or more packets from the ILB 120, add some more information to the packets, and reformat the packets in a common format for distribution to the Law Enforcement Agency (LEA) 130. However, when the amount of information being received as part of the intercept exceeds the capacity of one of these MDs 130, the hash function added to the data packets by the ILB 120 may allow for an intelligent distribution of the packets across the one or more MDs 130 to provide a mechanism for balancing the load of the intercept and/or a traffic flow across the one or more MDs 130. As a result, load balancing may be facilitated across the one or more Mediation Devices (MD) 130.

Each one of the MDs 130 may then independently deliver the packets to the LEA 140 where the LEA 130 may record and/or arrange the packets as desired. It should be appreciated that each of the MDs 130 may reformat the data packets so that adequate delivery may be made to the LEA 140. This may include reformatting, adding additional information, such as time stamp information, etc.

While a sequencing scheme keeps track of all intercepted information, it should be appreciated that such a load balancing feature or functionality may prevent the intercepted data packets from being lost or rendered useless. For example, if a large amount of information, such as 200,000,000 bits of information, is received at an MD 130 that is only capable of replicating 100,000,000 bits of information, the MD 130 may become overloaded and unable to transmit all the received information to the LEA 140. Accordingly, 100,000,000 bits of information or 50% of the data may be lost. Another example where loss may occur is if the 200,000,000 bits of information is spread across two MDs 130 such that each of the two MDs 130 may process 100,000,000 bits of information. While this may appear to solve the problem of using one MD, in the event one of the two MDs 130 fails, this would may still result in a 100,000,000 bit or 50% loss. In either case, it should be appreciated that even though 50% is lost mathematically in either scenario, such loss may be greater since the loss may be spread across all flows. For example, without a load balancing mechanism, if the information to be received at the MD 130 is ten images, instead of getting all ten pictures, the LEA may get ten pictures where each picture is cut in half. This represents a 50% loss but each of the ten pictures would be useless to the LEA 140. However, load balancing may eliminate or reduce such loss. For instance, even if one of two MDs 130 fail, adding hash functions to the intercepted information would provide optimized distribution of the packets so that a 100% loss of the only 50% of the flows may occur. In other words, referring to the example described above, the LEA 140 may lose five full pictures and receive five full pictures. Here, receiving five full pictures would be more usable data for the LEA 140 when compared to ten half-cut pictures.

There may be several ways an ILB 120 may use hash functions. For example, once data packets are intercepted, as described above, the packets may be encapsulated and/or identified. Once the data packets reach the ILB 120, the ILB 120 may add a hash value to each packet and recognize that they correspond to distinct flows. In one embodiment, the ILB 120 may determine that hash values within a first range may go to a first MD, hash values within a second range may go to a second MD, and so forth. Thus, in the example, the one or more MDs may be pre-set to receive packets having certain hash values.

In another embodiment, distribution of the packets from the ILB 120 to the MDs 130 may be more dynamic. For example, the packets may be distributed using a round-robin approach. In this example, each flow or packet may be distributed to all available MDs 130, one at a time, such that the frst flow that comes in goes to the first MD, the second flow that comes in goes to the second MD, the third flow that comes in goes to the third MD, and assuming, for example, that only three MDs are available, the fourth flow that comes in may go to the first MD.

It should be appreciated that while a few ways for distributing load across the one or more mediation devices (MDs) 130 are described above, other various ways of distributing packets may also be provided. It should be appreciated that the ILB 120 and the one or more MDs 130 may include the processing capability to minimize loss or error in distributing of data packets to the LEA 140.

An administrator 150 may also be provided in the system 100. The administrator 150 may receive requests from the LEA 140 and may communicate these requests to a network, e.g., system 100. For example, one or more set tap functions may be initiated by the administrator 150 so that each of the individual elements of the system 100, such as the IAD 110, the ILB 120, and the one or more MDs 130, will know what needs to be intercepted. In another embodiment, the administrator 150 may simply communicate with the one or more MDs 130, which would then communicate with the other system components.

Figure 2:
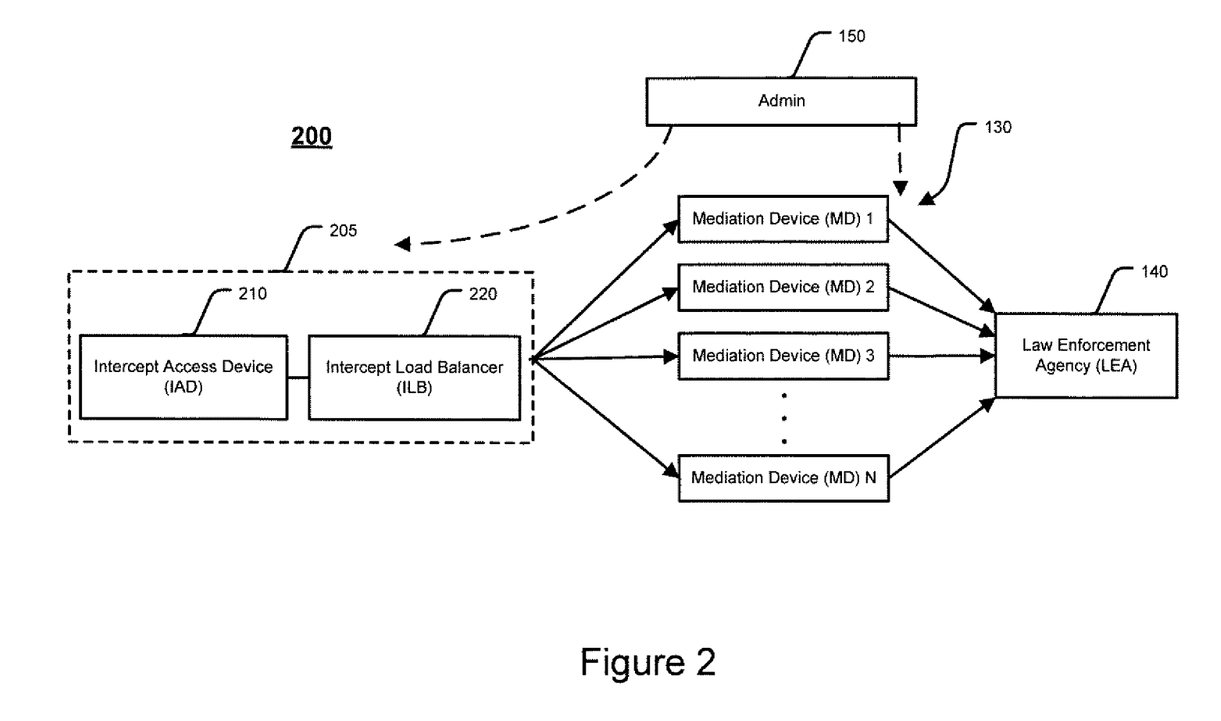
FIG. 2 depicts a block diagram of a system architecture for intercepting and load balancing information, according to another exemplary embodiment.

It should be appreciated that the ILB 120 may be an independent component of the system 100 (e.g., a stand-alone LA switching chassis), as depicted in FIG. 1. However, it should be appreciated that the ILB 120 may also be integrated with the IAD 110. For example, FIG. 2 depicts a block diagram of a system architecture for intercepting and load balancing information, according to another exemplary embodiment. In this example, the ILB 220 and the AD 210 may be integrated component 205 of the system 200. Here, the integrated component 205 may imbed the ILB 220 using hardware, such as ASIC/FPG/GCPU and/or software combinations. In yet another embodiment, an expansion daughtercard/module may be provided to integrate the ILB with the IAD. Other various embodiments may also be provided.

The integrated component 205 of system 200 may function similarly to the individual IAD 110 and ILB 120, as discussed above in regards to FIG. 1. For example, the integrated component 205 may perform all the functions of IAD 210 and ILB 220 as discussed above with reference to the IAD 110 and ILB of FIG. 1.

Figure 3:
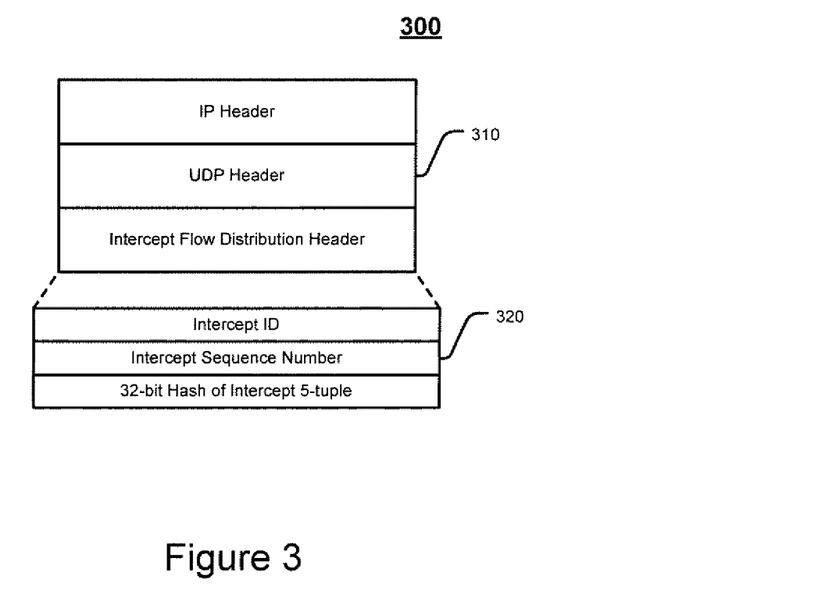
FIG. 3 depicts an exemplary header format for a packet, according to an exemplary embodiment.

FIG. 3 depicts an exemplary header format for a packet, according to an exemplary embodiment. In this example, an intercepted packet may include a header 310. This header 310 may include an IP Header and/or a UDP Header that allows for intercepted data to be encapsulated in a manner that permits delivery to a specific device performing a load-balancing or mediation function. Once the IAD intercepts a data packet, an intercept encapsulation header 320 may be added, as described above, to the header 310. The intercept encapsulation header 320 may include a 32-bit Intercept ID, a 32-bit intercept sequence number, and a hash derived from the original intercepted packet's 5-tuple.

It should be appreciated that the 32-bit intercept sequence number may be initialized at zero, transmitted in the first packet, and then incremented by 1 per packet thereafter for the life of the flow. Accordingly, the ILB may be required to track the sequence number's value per Intercept ID in one or more tables in memory or in accessible data storage location. For example, as shown below, TABLE 1 depicts an Intercept ID and Intercept Sequence Numbers Table and TABLE 2 depicts an Intercept forwarding information base.

TABLE 1 d Intercept Sequence Numbers Table

| Intercept ID | Current Intercept Sequence Number |
|---|---|
| 100 | 5000 |
| 100 | 5001 |
| 200 | 990 |
| 200 | 991 |

TABLE 2

Intercept Forwarding Information Base

| Intercept ID | Hash value | MD |
|---|---|---|
| 100 | 0xAE41 | 1.1.1.1 |
| 100 | 0xAA30 | 1.1.1.2 |
| 200 | 0xC1D1 | 1.1.1.3 |
| 200 | 0x00AA | 1.1.1.1 |

It should be appreciated that one or more counters may be used to track the values of Intercept IDs, hash values, and Sequence Numbers on the ILB. It should also be appreciated that while the intercept encapsulation header 320 uses 32-bit values for each of the fields, other various bit values may also be provided (e.g., 8-bit, 16-bit, 64-bit, etc.).

It should be appreciated that the system 100 may be implemented by any telecommunication carrier. These may include common telephone carriers, facilities-based broadband Internet access providers, providers of interconnected Voice over Internet Protocol (VoIP) service, and/or other similar service providers that facilitate communication and/or information transmission.

Communication between the various servers, devices, and/or components of system 100 may be achieved via transmission of electric, electromagnetic, optical, or wireless signals and/or data packets that carry digital data streams using a standard telecommunications protocol and/or a standard networking protocol. These may include Session Initiation Protocol (SIP), Voice Over IP (VoIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections, such as an Ethernet RJ45/Category 5 Ethernet connection, a fiber connection, a traditional phone wireline connection, a cable connection or other wired network connection, may also be used. Communication between the network providers and/or clients may also use standard wireless protocols including IEEE 802.11a, 802.11b, 802.11g, etc., or via protocols for a wired connection, such as an EEE Ethernet 802.3.

It should be appreciated that while FIGS. 1 and 2 depict one IAD, one ILB, and four (4) MDs, a greater or lesser number of these system components may also be provided. Furthermore, it should be appreciated that the systems FIGS. 1 and 2 may be a small network or a large network. It should also be appreciated that although depicted as a singular system, multiple systems may be communicatively coupled to perform the features and functionalities discussed above. Other various embodiments may also be provided.

Figure 4:
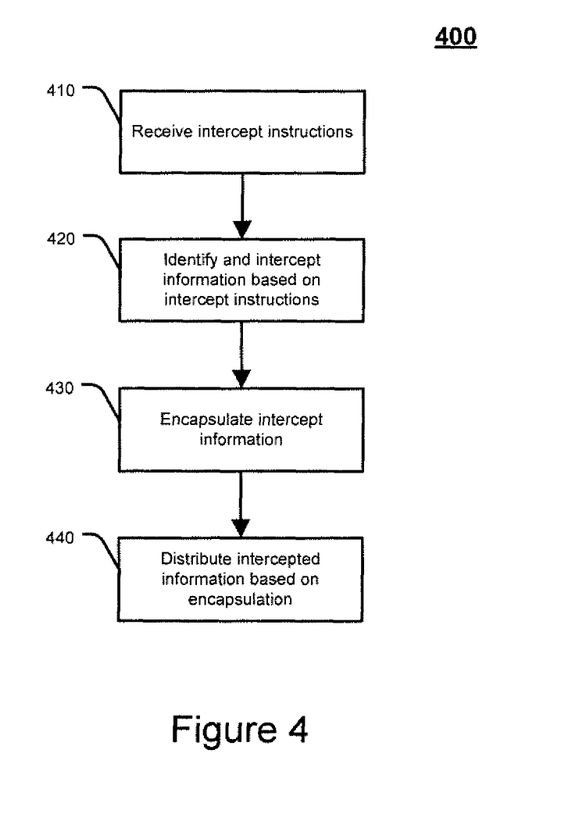
FIG. 4 depicts a flowchart of a method for intercepting and load balancing information, according to an exemplary embodiment.

FIG. 4 depicts a flowchart of a method for intercepting and load balancing information 400, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods, or subroutines carried in the exemplary method 400. A computer readable media comprising code to perform the acts of the method 400 may also be provided. Referring to FIG. 4, the exemplary method 400 may begin at block 410.

At block 410, intercept instructions may be received. For example, one or more mediation devices (MDs) 130 may receive intercept instructions for intercepting information, e.g., one or more data packets, for a predetermined period of time.

At block 420, information may be identified and intercepted. For example, an intercept access device may receive the intercept instructions from the one or more mediation devices. The intercept access device (IAD) 110 may identify and intercept information based on the intercept instructions.

At block 430, the intercepted information may be encapsulated. For example, the IAD 110 may encapsulate the intercepted information by providing an Intercept ID and an intercept sequence number to the intercepted information. This may ensure that intercepted information is transmitted from the IAD 110 to the ILB 120 and/or the one or more MDs 130 so that it may be distributed for load-balancing and/or to minimize loss of information.

At block 440, the intercepted information may be distributed. For example, the intercept load balancer (ILB) 120 may receive the intercepted information from the AD 110 and transmit the intercepted information to the one or more mediation devices for distribution to law enforcement, e.g., the LEA 140. In one embodiment, the ILB 120 may add a hash function to the intercepted information so that the intercepted information is load-balanced across the one or more mediation devices (MDs) 130 to optimize distribution to law enforcement.

It should be appreciated that the method 400 may be achieved in real-time or near real-time.

Figure 5:
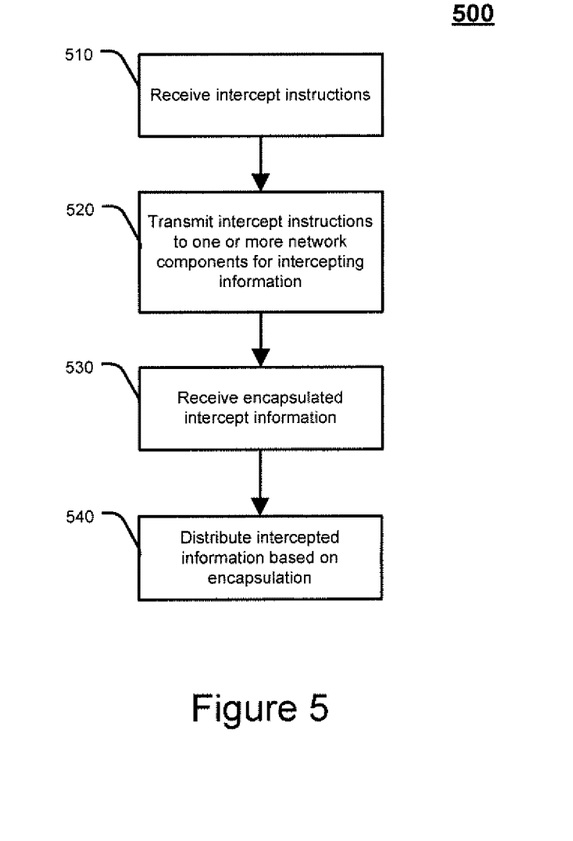
FIG. 5 depicts a flowchart of a method for intercepting and load balancing information, according to another exemplary embodiment.

FIG. 5 depicts a flowchart of a method for intercepting and load balancing information 500, according to another exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. A computer readable media comprising code to perform the acts of the method 500 may also be provided. Referring to FIG. 4, the exemplary method 500 may begin at block 510.

At block 510, intercept instructions may be received. For example, the one or more mediation devices (MDs) 130 (e.g., one or more servers) may receive intercept instructions (e.g., from an administrator) for intercepting information for a predetermined period of time.

At block 520, the intercept instructions may be transmitted. For example, the one or more MDs 130 may transmit the intercept instructions to one or more devices, such as the IAD 110 and/or the ILB 120, to identify and intercept information based on the intercept instructions, encapsulate the intercepted information, and load balance the intercepted information across the one or more MDs 130.

At block 530, the intercepted information may be received. For example, the one or more MDs may receive the intercepted information for distribution of the information to law enforcement, e.g., the LEA 140. In one embodiment, the encapsulated intercepted information may encapsulated at the one or more MDs. This may allow sequential reception of the intercepted information and may be based on at least one of an Intercept ID and an intercept sequence number in the encapsulated intercepted information. In another embodiment, the encapsulated intercepted information may be encapsulated for load balancing at the one or more MDs to optimize distribution of the intercepted information to law enforcement. In yet another embodiment, the one or more MDs may also format the intercepted information for distribution to law enforcement.

In summary, embodiments may provide a system and method for distributing lawful intercept traffic between multiple Mediation Devices (MDs) from an Intercept Access Device (IAD). The system and method may distribute data packets in order to a Law Enforcement Agency (LEA). Either the IAD 110 or the Intercept Load Balancer (B) may encapsulate the intercepted flow of information and set a sequence number in the new packet's header. The "new" packet may encode the IP address of the IAD or ILB as the source and the MD as the destination. The Intercept Load Balancer (ILB) may also create a hash based on the intercepted flow's intercept encapsulation header and the original packet's 5-tuple, which includes source IP, destination IP, protocol, source port number, and destination port number. Thus, the sequence number not only maintains proper flow sequence but also can be used by the LEA to determine data packet receipt from each intercepted flow of an associated Intercept ID.

While depicted as network components, servers, and/or devices, it should be appreciated that embodiments may be constructed in software and/or hardware, as a separate and/or stand-alone device, or as part of an integrated transmission and/or switching device.

It should be appreciated that although embodiments are described primarily with complying with the CALEA requirements, the systems and methods discussed above are provided as merely exemplary and may have other applications. These may include comprehensive network maintenance, data delivery, marketing and advertisement-directed services, etc.

Additionally, it should also be appreciated that system support and updating the various components of the system may be easily achieved. For example, an administrator may have access to one or more of these system components (e.g., the IAD 110, the ILB 120, and the one or more MDs 130). It should also be appreciated that the one or more system components, servers, and/or devices of the system may not be limited to physical components. These components may be software-based, virtual, etc. Moreover, the various components, servers, and/or devices may be customized to perform one or more additional features and functionalities. Such features and functionalities may be provided via deployment, transmitting and/or installing software/hardware.

It should also be appreciated that each of the may include one or more processors (not shown) for optimizing information intercept and load balancing. It should be appreciated that one or more data storage systems (e.g., databases) (not shown) may also be coupled to each of the devices or servers of the system. In one embodiment, the one or more data storage systems may store relevant information for each of the servers and system components.

It should be appreciated that the contents of any of these one or more data storage systems may be combined into fewer or greater numbers of data storage systems and may be stored on one or more data storage systems and/or servers. Furthermore, the data storage systems may be local, remote, or a combination thereof to clients systems, servers, and/or other system components. In another embodiment, information stored in the databases may be useful in providing additional customizations for optimizing information intercepts and load balancing.

By performing the various features and functions as discussed above, the intercepted information distributed to law enforcement may better comply with the CALEA requirements. Not only does this provide an effective and improved technique for intercepting information and keeping track of all information distributed to law enforcement, it may also provide load-balancing across all flows so that overall distribution of intercepted information may be be enhanced.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A system, comprising:
a plurality of mediation devices, at least one of the plurality of mediation devices configured to receive intercept instructions for intercepting information for a predetermined period of time;
an intercept access device configured to receive the intercept instructions from at least one of the one or more mediation devices, wherein the intercept access device identifies and intercepts information based on the intercept instructions and encapsulates the intercepted information by associating an intercept identifier and an intercept sequence number with the intercepted information, wherein the intercepted information comprises a 5-tuple, wherein the 5-tuple comprises a protocol, wherein the information is part of a flow, wherein the intercept access device is further configured to initialize the intercept sequence number for the first intercepted information in the flow and increment the intercept sequence number for each intercepted information for the life of the flow; and
an intercept load balancer configured to:
receive the intercepted information,
add a hash of the intercepted 5-tuple to the intercepted information, wherein the hash is based at least in part on the protocol,
sequentially order the intercepted information based on the intercept sequence number of the intercepted information, and
transmit the intercepted information to at least one of the plurality of mediation devices for distribution to one or more law enforcement devices, wherein the intercept load balancer transmits the intercepted information across the plurality of mediation devices to load balance and optimize distribution of the intercepted information to law enforcement.

2. The system of claim 1, wherein the intercept load balancer load balances the intercepted information based on the hash of the intercepted information.

3. The system of claim 2, wherein the intercept load balancer transmits the intercepted information to a first mediation device within the plurality of mediation devices based on whether the hash falls within a first range.

4. The system of claim 2, wherein the intercept load balancer transmits the intercepted information to a second mediation device within the plurality of mediation devices based on whether the hash falls within a second range.

5. The system of claim 2, wherein the intercept load balancer transmits the intercepted information to a certain mediation device within the plurality of mediation devices based on when the intercepted information was received by the intercept load balancer.

6. The system of claim 1, wherein each intercepted information within a flow has a similar hash value, wherein the intercept load balancer is configured to optimize the distribution of the intercepted information by transmitting a flow to a single mediation device within the plurality of mediation devices.

7. A method, comprising:
receiving intercept instructions to intercept information for a predetermined period of time;
identifying and intercepting information based on the intercept instructions, wherein the intercepted information comprises a 5-tuple, wherein the 5-tuple comprises a protocol;
encapsulating the intercepted information, wherein encapsulating the intercepted information comprises associating an intercept identifier and an intercept sequence number with the intercepted information, wherein the information is part of a flow, wherein encapsulating the intercepted information further comprises initializing the intercept sequence number for the first intercepted information in the flow and incrementing the intercept sequence number for each intercepted information for the life of the flow;

sequentially ordering the intercepted information based on the intercept sequence number of the intercepted information using an intercept load balancer; and transmitting, by the intercept load balancer, the intercepted information and an added hash of the intercepted 5-tuple for distribution of the intercepted information to law enforcement, wherein the hash is based at least in part on the protocol, wherein the intercept load balancer transmits the intercepted information across the plurality of mediation devices to load balance and optimize distribution of the intercepted information to law enforcement.

8. The method of claim 7, wherein the intercepted information is load-balanced across one or more servers to optimize distribution to law enforcement.

9. The method of claim 7, wherein the method is achieved in at about real-time or near real-time.

10. A non-transitory computer readable medium comprising code which when executed causes a computer to perform the method of claim 7.

11. The method of claim 7, wherein the intercept load balancer load balances the intercepted information based on the hash of the intercepted information.

12. The method of claim 11, wherein the intercept load balancer transmits the intercepted information to a first mediation device within the plurality of mediation devices based on whether the hash falls within a first range.

13. The method of claim 11, wherein the intercept load balancer transmits the intercepted information to a second mediation device within the plurality of mediation devices based on whether the hash falls within a second range.

14. The method of claim 11, wherein the intercept load balancer transmits the intercepted information to a specific mediation device within the plurality of mediation devices based on when the intercepted information was received by the intercept load balancer.

15. The method of claim 7, wherein each intercepted information within a flow has a similar hash value, wherein the intercept load balancer optimizes the distribution of the intercepted information by transmitting a flow to a single mediation device within the plurality of mediation devices.

16. A system, comprising:
a first receiver configured to receive intercept instructions for intercepting information for a predetermined period of time;
a first transmitter communicatively coupled to one or more devices and configured to transmit the intercept instructions to the one or more devices for identifying and intercepting information based on the intercept instructions, encapsulate the intercepted information by associating an intercept identifier and an intercept sequence number with the intercepted information, wherein the information is part of a flow, wherein encapsulating the intercepted information further comprises initializing the intercept sequence number for the first intercepted information in the flow and incrementing the intercept sequence number for each intercepted information for the life of the flow, sequentially order the intercepted information based on the intercept sequence number of the intercepted information, and load balance the intercepted information, wherein the load balancing comprises transmitting the intercepted information across a plurality of mediation devices to optimize distribution to law enforcement, wherein the intercepted information comprises a 5-tuple, wherein the 5-tuple comprises a protocol, and adding a hash of the intercepted 5-tuple to the intercepted information, wherein the hash is based at least in part on the protocol;
a second receiver configured to receive the intercepted information;
a processor configured to format the intercepted information; and
a second transmitter configured to transmit the formatted intercept information to one or more law enforcement devices.

17. The system of claim 16, wherein the second receiver receives the intercepted information in sequential order.

18. The system of claim 16, wherein the processor formats the intercepted information by decapsulating the encapsulated intercepted information for load balancing such that distribution to law enforcement is optimized.

19. A method, comprising:
receiving, at one or more servers, intercept instructions to intercept information for a predetermined period of time;
transmitting, from the one or more servers, the intercept instructions to one or more devices to identify and intercept information based on the intercept instructions, encapsulate the intercepted information, load balance the intercepted information across the one or more servers, wherein the intercepted information comprises a 5-tuple, wherein the 5-tuple comprises a protocol, and add a hash of the intercepted 5-tuple to the intercepted information, wherein the hash is based at least in part on the protocol; and
receiving, at the one or more servers, the load-balanced intercepted information for optimal distribution of the intercepted information to law enforcement, wherein the encapsulated intercepted information is decapsulated, at the one or more servers, and sequentially distributed based on at least one of an intercept identifier and an intercept sequence number in the encapsulated intercepted information, wherein the information is part of a flow, wherein encapsulating the intercepted information comprises initializing the intercept sequence number for the first intercepted information in the flow and incrementing the intercept sequence number for each intercepted information for the life of the flow.

20. The method of claim 19, wherein the encapsulated intercepted information is decapsulated for load balancing at the one or more servers to optimize distribution to law enforcement.

21. The method of claim 19, further comprising formatting the intercepted information for distribution to law enforcement.

22. A non-transitory computer readable medium comprising code which when executed causes a computer to perform the method of claim 19.

* * * * *